(12) United States Patent
Shih

(10) Patent No.: US 12,254,224 B2
(45) Date of Patent: Mar. 18, 2025

(54) DOCUMENT PROCESSING SYSTEM WITH ONE-KEY PRINTING AND CONTROL METHOD THEREOF

(71) Applicant: AVISION INC., Hsinchu (TW)

(72) Inventor: Po-Sheng Shih, Hsinchu (TW)

(73) Assignee: AVISION INC., Hsinchu (TW)

( * ) Notice: Subject to any disclaimer, the term of this patent is extended or adjusted under 35 U.S.C. 154(b) by 0 days.

(21) Appl. No.: 18/505,147

(22) Filed: Nov. 9, 2023

(65) Prior Publication Data

US 2024/0160389 A1     May 16, 2024

(30) Foreign Application Priority Data

Nov. 11, 2022   (TW) .................................. 111143267

(51) Int. Cl.
  *G06F 3/12*     (2006.01)
(52) U.S. Cl.
  CPC .......... *G06F 3/1204* (2013.01); *G06F 3/1257* (2013.01); *G06F 3/128* (2013.01); *G06F 3/1284* (2013.01); *G06F 3/12* (2013.01)
(58) Field of Classification Search
  None
  See application file for complete search history.

(56) References Cited

U.S. PATENT DOCUMENTS

| 2006/0250494 A1* | 11/2006 | Silverbrook | B41J 3/44 347/200 |
| 2010/0115465 A1* | 5/2010 | Lu | G06F 21/32 715/764 |
| 2010/0158410 A1* | 6/2010 | Kusakabe | G06T 1/00 345/428 |
| 2015/0009518 A1* | 1/2015 | Kashiwagi | H04N 1/00755 358/1.13 |

FOREIGN PATENT DOCUMENTS

| CN | 106042639 B | 5/2018 |
| TW | I749755 B | 12/2021 |
| TW | 202211666 A | 3/2022 |

* cited by examiner

*Primary Examiner* — Darryl V Dottin

(57) ABSTRACT

Disclosed is a document processing system with one-key printing, which includes a printing device, a scanning device, an interface module and a processing device. The scanning device is provided for inputting a scanning image. The interface module is provided for inputting commands or outputting information. The processing device is electrically connected to the printing device, the scanning device and the interface module respectively. The processing device performs a printing process based on the scanning image to make the printing device perform printing and generate prompt information through the interface module. When the processing device determines that it receives a one-key execution command input by the interface module, the processing device performs the printing process again based on the scanning image to make the printing device perform printing again without repeatedly inputting images and repeatedly manipulating settings, thereby improving the convenience and efficiency of use.

11 Claims, 4 Drawing Sheets

DOCUMENT PROCESSING SYSTEM WITH ONE-KEY PRINTING AND CONTROL METHOD THEREOF

CROSS REFERENCE TO RELATED PRESENT DISCLOSURE

This application claims the priority benefit of Taiwan Patent Application Serial Number 111143267, filed on Nov. 11, 2022, the full disclosure of which is incorporated herein by reference.

BACKGROUND

Technical Field

The present disclosure relates to a document processing system, in particular to a document processing system with one-key printing and a control method thereof.

Related Art

At present, there are often various documents that need to be copied in enterprises or government agencies. In order to cope with the sudden demand for copying of different paper documents and to facilitate the use of counter staff or administration staff, a multi-function machine is set up next to the counter or seat in enterprises or government agencies, to improve the efficiency of copying.

In the prior art, the multi-function machine is a multi-function printer disclosed in the Taiwan Invention Patent Number TWI749755, wherein in the main technical contents of the multi-function printer, the multi-function printer includes a printing body and a scanning body; the scanning body is disposed on one side of the printing body; the width of the side of the multi-function printer is slightly greater than the width of the scanner body; when the scanning body senses presence of a sheet, the scanning body performs image scanning on the sheet to obtain image data, and then the printing body prints out the image data.

Although the scanning body is disposed on the side of the existing multi-function printer to change the user's sheet placing action, the space utilization is improved. The existing multi-function printer improves space utilization, but there are problems that the users need to set the printing parameters through a control component of the existing multi-function printer before printing images and it is not easy to modify the set printing parameters.

The existing multi-function printer needs to be reset every time the user places sheets for scanning, which is inconvenient to use. Specially, the counter staff of the government agency needs to scan and copy various paper documents instantly and repeatedly for different official tasks. There are still problems of time consumption and inconvenience in the existing multi-function printer due to unnecessary repeated actions. Therefore, it is necessary to propose a better solution.

SUMMARY

In view of the above-mentioned problems in the prior art, the present disclosure discloses a document processing system with one-key printing and a control method thereof. The document processing system with one-key printing and the control method thereof provide the flexibility to perform printing and/or reprinting immediately in a convenient manner by retaining the scanning image when the user needs to print the paper document again. Since there is no need to repeatedly input images and repeatedly manipulate settings, the burden can be effectively reduced, thereby improving the convenience and efficiency of use.

To achieve the above purpose, the present disclosure discloses a document processing system with one-key printing, which includes a printing device; a scanning device disposed on one side of the printing device and provided for inputting a scanning image; an interface module provided for inputting commands or outputting information; and a processing device electrically connected to the printing device, the scanning device and the interface module respectively; wherein the processing device receives the scanning image, and performs a printing process based on the scanning image, so that the printing device performs printing, and generates prompt information through the interface module; the processing device determines whether a one-key execution command input by the interface module is received; when the processing device determines that it receives the one-key execution command, the processing device performs the printing process again based on the scanning image, so that the printing device performs printing again.

To achieve the above purpose, the present disclosure further discloses a control method of a document processing system with one-key printing, wherein the document processing system has a processing device, and the control method comprises the following steps executed by the processing device: receiving a scanning image; performing a printing process based on the scanning image and generating prompt information; determining whether a one-key execution command is received; and performing the printing process again based on the scanning image when it is determined that the one-key execution command is received.

According to the above technical means, when the processing device receives the one-key execution command, the printing process is performed again based on the scanning image, so that the printing device performs printing again. In terms of use of the document processing system, since there is no need to repeatedly manipulate settings and repeatedly place the same sheet for scanning, only by the above-mentioned one-key execution command, the document processing system has the flexibility to perform printing immediately and/or continue printing in one step, thereby improving the convenience and efficiency of use.

BRIEF DESCRIPTION OF THE DRAWINGS

Accompanying drawings described herein are intended to provide a further understanding of the present disclosure and form a part of the present disclosure, and exemplary embodiments of the present disclosure and descriptions thereof are intended to explain the present disclosure but are not intended to unduly limit the present disclosure. In the drawings.

DETAILED DESCRIPTION OF THE EMBODIMENTS

The embodiments of the present disclosure will be described below in conjunction with the relevant drawings. In the figures, the same reference numbers refer to the same or similar components or method flows.

It must be understood that the words "including", "comprising" and the like used in this specification are used to indicate the existence of specific technical features, values, method steps, work processes, elements and/or components. However, it does not exclude that more technical features, values, method steps, work processes, elements, components, or any combination of the above can be added.

It must be understood that when an element is described as being "connected" or "coupled" to another element, it may be directly connected or coupled to another element, and intermediate elements therebetween may be present. In contrast, when an element is described as "directly connected" or "directly coupled" to another element, there is no intervening element therebetween.

Figure 1:
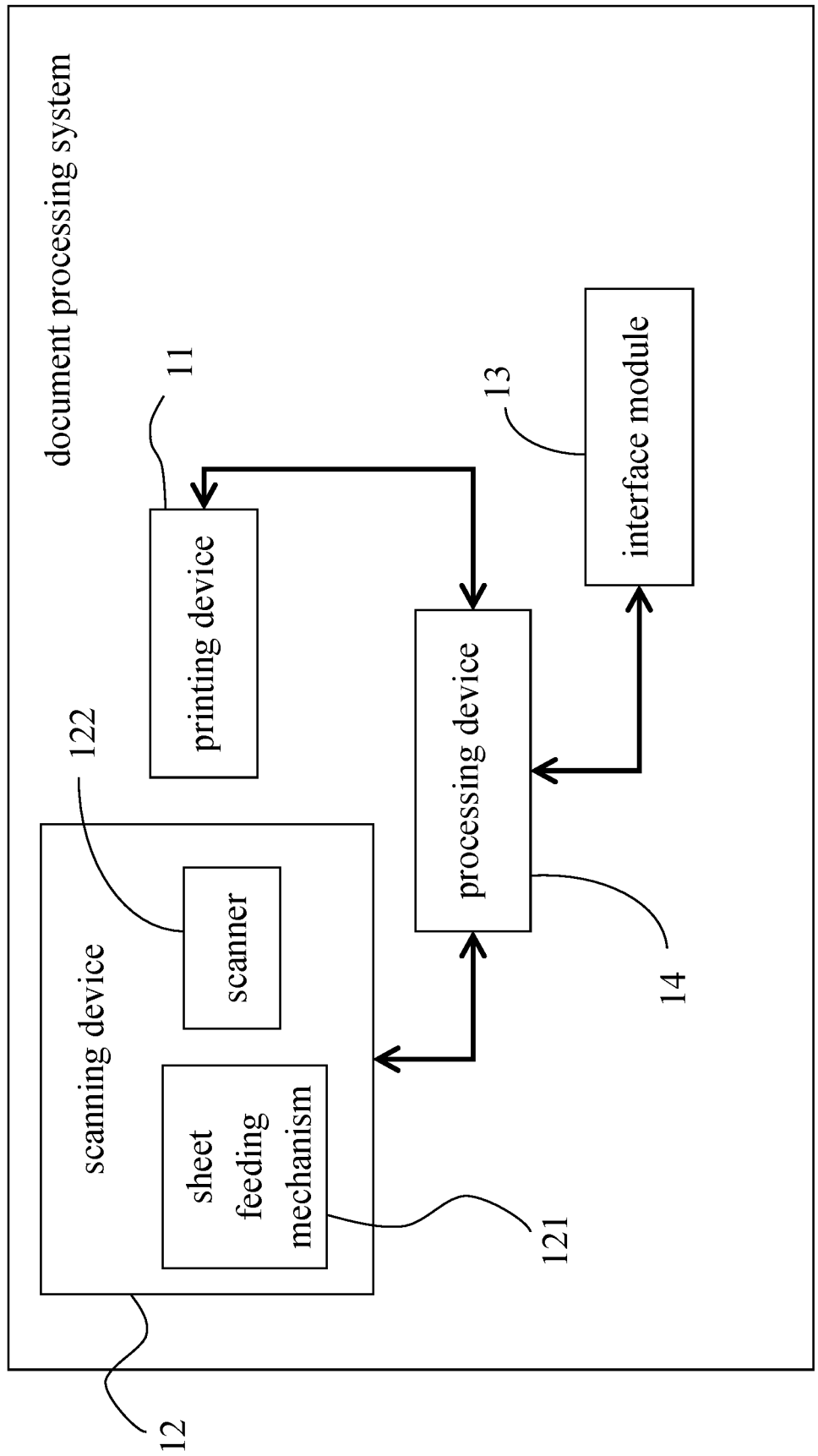
FIG. 1 is a block diagram of a document processing system with one-key printing according to a preferred embodiment of the present disclosure.
Figure 2:
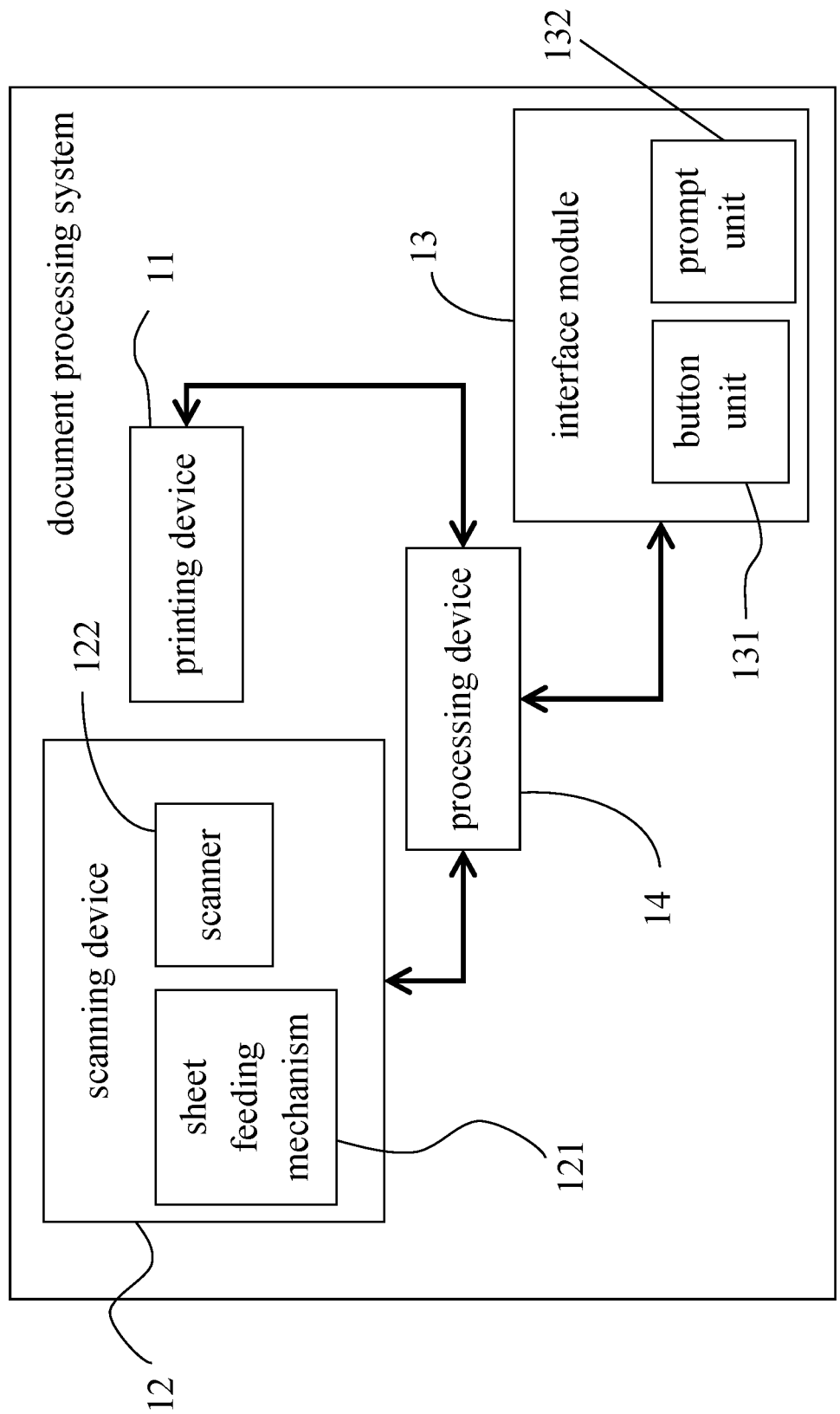
FIG. 2 is another block diagram of the document processing system with one-key printing according to the preferred embodiment of the present disclosure.

Regarding a document processing system with one-key printing according to a preferred embodiment of the present disclosure, please refer to FIG. 1 and FIG. 2, wherein the document processing system with one-key printing comprises a printing device 11, a scanning device 12, an interface module 13 and a processing device 14, the scanning device 12 is disposed on one side of the printing device 11 to facilitate easy access by the user from the side, the interface module 13 is disposed on the printing device 11, and the processing device 14 is electrically connected to the printing device 11, the scanning device 12 and the interface module 13 respectively.

The printing device 11 is configured to print out scanned images, and the scanning device 12 is disposed on the side of the printing device 11 and is provided for inputting a scanning image. In this embodiment, the scanning device 12 comprises a sheet feeding mechanism 121 and a scanner 122, and the sheet feeding mechanism 121 is an automatic document feeder (ADF). When the sheet feeding mechanism 121 detects more than one media document, the media documents can be fed in sequence and scanned by the scanner 122 to obtain scanning images corresponding thereto.

The interface module 13 is disposed on the casing of the printing device 11 and is located in a field of view of a user looking down to facilitate operation. The interface module 13 is provided for inputting commands or outputting information. In this embodiment, the interface module 13 comprises a button unit 131 and a prompt unit 132, wherein the button unit 131 is configured to provide the user with a one-key operation to input information, and the prompt unit 132 is configured to generate prompt information for prompting.

In this embodiment, the button unit 131 comprises a physical button or a non-physical button. When the button unit 131 is a non-physical button, the non-physical button can be composed of a fingerprint recognition module, wherein the size of the button unit 131 of the interface module 13 is just matched with that of a human finger.

In this embodiment, the prompt unit 132 can be an LED unit and is disposed around the periphery or the bottom of the button unit 131 or on the housing of the button unit 131, or on the casing of the printing device 11 and adjacent to the button unit 131, and reminds the user by generating lighting or flashing lights. Specifically, the prompt information generated by the LED unit can be represented by a flashing monochromatic light, a continuous monochromatic light, or a continuous flashing light with different colors to remind the user. By emitting light, the LED unit can remind the user of the situation without affecting the user's concentration.

In another embodiment, the prompt unit 132 can be a sound unit, and the sound unit can be specifically composed of a buzzer. The prompt information generated by the sound unit can be represented by a single tone or rhythm syllables. Through sound reminder, the user can be reminded in a significant way.

In another embodiment, the prompt unit 132 may be an LED display unit. The LED display unit can be specifically composed of an LED display panel, and the LED display panel comprises more than two or more than three LED lights. The prompt information generated by the LED display unit can be represented by a static light or a dynamic light. The LED display unit uses more than two or more than three LED lights to illuminate statically or dynamically (such as a marquee) to provide a prompt, which can reduce the manufacturing cost while still making it easy for users to identify the meaning of the prompt, to effectively improve the convenience of use.

The processing device 14 is disposed inside the printing device 11 for processing the received information. The processing device 14 performs a printing process based on the scanning image input by the scanning device 12, so that the printing device 11 prints out the scanning image, and the interface module 13 generates the prompt information. In this embodiment, the printing process comprises an automatic printout process. The automatic printout process means that the processing device 14 sends the scanning image to the printing device 11 and drives the printing device 11 to perform printing to print out a document.

In this embodiment, before the user places the sheet to be scanned on the sheet feeding mechanism 121 of the scanning device 12, the user does not need to use the button unit 131 of the interface module 13 to cause the scanning device 12 to perform any operations or execute any preset procedures. The user only needs to place the sheet to be scanned on the sheet feeding mechanism 121 of the scanning device 12. The sheet feeding mechanism 121 automatically feeds the sheet into the scanning device 12. After the scanner 122 scans the fed sheet, the scanner 122 transmits the corresponding scanned image to the processing device 14. The processing device 14 receives the scanning image and performs the printing process based on the scanning image, so that the printing device 11 prints out the scanning image, and the processing device 14 generates a prompt command and sends the prompt command to the interface module 13. The prompt unit 132 of the interface module 13 generates the prompt information according to the prompt command, and the prompt information is presented by means of light or sound to remind the user that the scanning image currently exists.

After the processing device 14 generates the prompt information, the processing device 14 is in a waiting state and determines whether a one-key execution command generated by the user's one-key operation through the button unit 131 is received. When the processing device 14 determines that the one-key execution command is received, the processing device 14 performs the printing process based on the scanning image, so that the printing device 11 prints out the scanning image again. When the processing device 14 determines that the one-key execution command is not received, the processing device 14 is in the waiting state.

In this embodiment, if the scanning device 12 does not input a new scanning image, the processing device 14 continues to determine whether the one-key execution command is received. If the scanning device 12 inputs a new scanning image, the processing device 14 performs the printing process based on the new scanning image, so that the printing device 11 prints out the new scanning image; and subsequently, when the processing device 14 receives the one-key execution command, it performs the printing process to make the printing device 11 print out the new scanning image.

In terms of use of the document processing system, since the user does not need to repeatedly manipulate the settings or repeatedly place the same sheet for scanning, thereby improving the convenience and efficiency of use.

Figure 3:
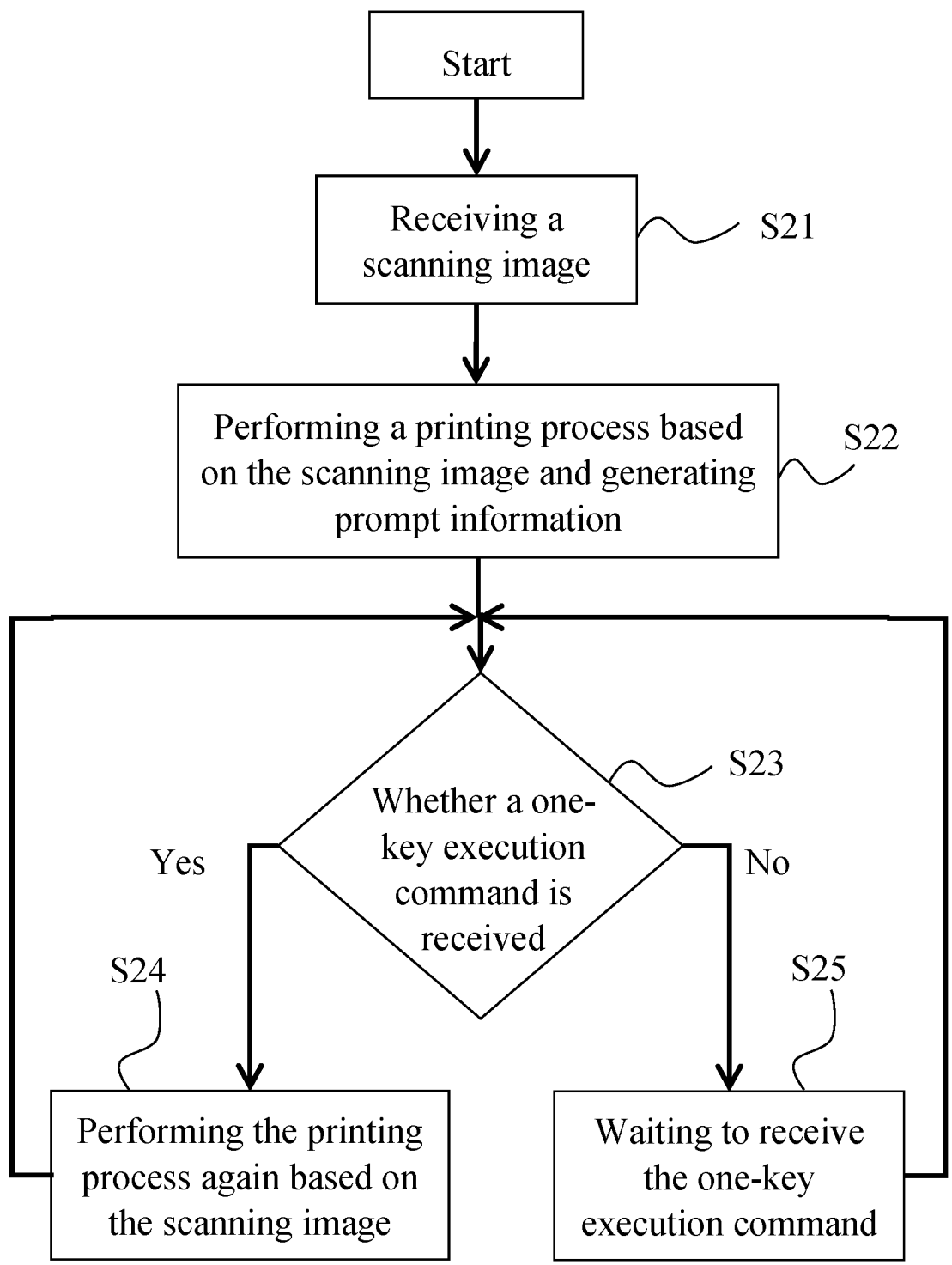
FIG. 3 is a flow chart of a control method of a document processing system with one-key printing according to a preferred embodiment of the present disclosure.

According to the above content, please refer to FIG. 1 and FIG. 3, a control method of a document processing system with one-key printing is provided, wherein the document processing system with one-key printing has the processing device 14, and the control method comprises the following steps executed by the processing device 14: receiving a scanning image (S21); performing a printing process based on the scanning image and generating prompt information (S22); determining whether a one-key execution command is received (S23); and performing the printing process again based on the scanning image when it is determined that the one-key execution command is received (S24). In this embodiment, after executing the above-mentioned step of performing the printing process again based on the scanning image (S24), the processing device 14 can executes the above-mentioned step of determining whether a one-key execution command is received (S23) again, and then when the processing device 14 determines that the one-key execution command is received, the processing device 14 performs the printing process again based on the scanning image (S24). In this way, one-key operations can be performed repeatedly to print out multiple documents corresponding to the same scanning image according to the user's one-key operation behavior.

Further, when the processing device 14 determines that the one-key execution command is not received, the processing device 14 waits to receive the one-key execution command (S25), and then returns to execute the step (S23) of determining whether a one-key execution command is received, to determine whether the one-key execution command is received again.

In this embodiment, before the processing device 14 executes the aforementioned step (S21) of receiving a scanning image, the user places the sheet to be scanned on the sheet feeding mechanism 121 of the scanning device 12, the user does not need to use the button unit 131 of the interface module 13 to cause the scanning device 12 to perform any operations or execute any preset procedures, the sheet feeding mechanism 121 feed the sheet into the scanning device 12, and after the scanner 122 completes the scanning of the fed sheet, the scanner 122 transmits the scanning image to the processing device 14.

In this embodiment, the printing process comprises an automatic printout process. The automatic printout process means that the processing device 14 sends the scanning image to the printing device 11 and drives the printing device 11 to perform printing to output the printed document.

Figure 4:
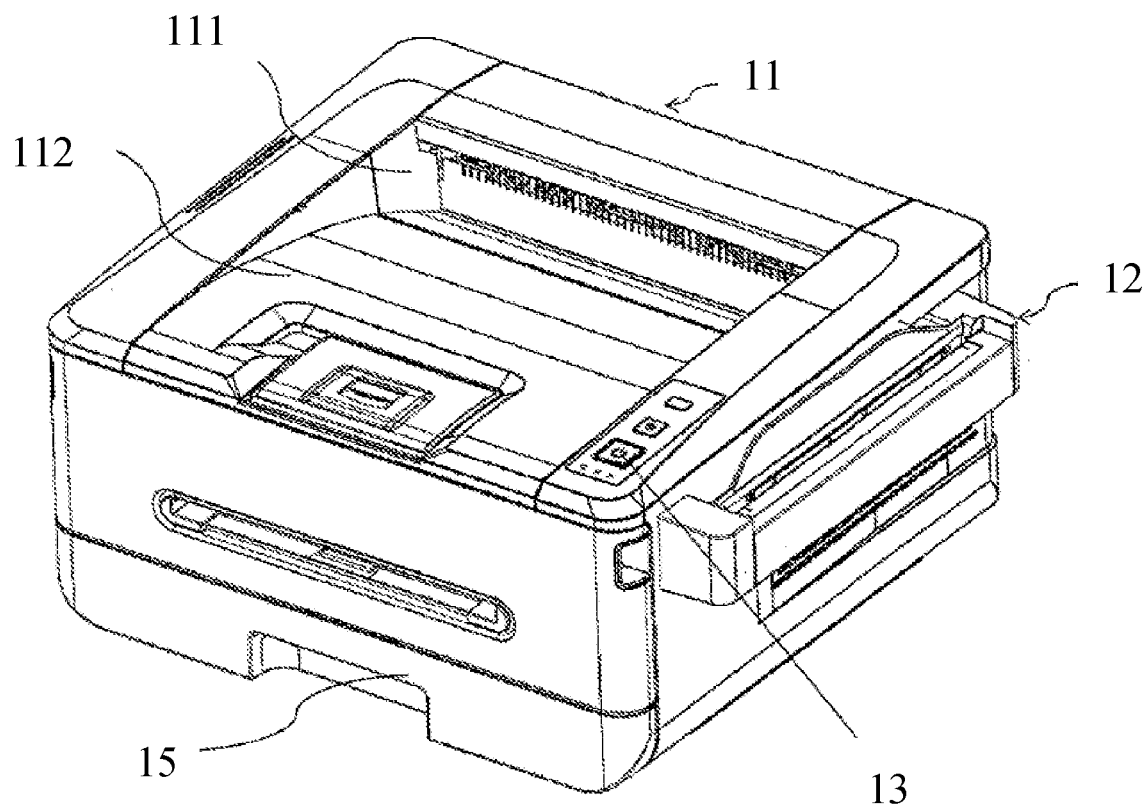
FIG. 4 is a schematic diagram showing an appearance of a document processing system with one-key printing according to a preferred embodiment of the present disclosure.

To illustrate the specific application of this preferred embodiment, please refer to FIG. 4. The scanning device 12 is disposed on the side of the printing device 11 to facilitate easy access by the user from the side. The interface module 13 can be disposed on the casing of the printing device 11 and close to the scanning device 12, so that the user can operate the buttons on the interface module 13 and quickly perform operations with a single button. In this preferred embodiment, a printing paper tray 15 can be provided below the printing device 11, so that the documents to be output can be placed in the printing paper tray 15. In this preferred embodiment, the printing device 11 has a paper outlet 111 and a paper output tray 112. When the above-mentioned printing process is performed, the printing device 11 is driven to perform printing, and the printed document is output from the paper outlet 111, so that the printed document is placed on the paper output tray 112. That is to say, scanning and printing output can be smoothly completed using the very simplified document processing system with one-key printing and the control method thereof.

According to the above content, in the document processing system with one-key printing and the control method thereof in the present disclosure, when the user wants to repeatedly print the same scanning image, there is no need for complicated operations or reload the sheet for scanning, and the user only needs to perform a one-key operation through the button unit 131, so that the processing device 14 performs the printing process according to the one-key execution command to make the printing device 11 perform printing based on the scanning image, thereby reducing the user's operational burden, improving the user's work efficiency, and improving convenience and efficiency of use.

While the present disclosure is disclosed in the foregoing embodiments, it should be noted that these descriptions are not intended to limit the present disclosure. On the contrary, the present disclosure covers modifications and equivalent arrangements obvious to those skilled in the art. Therefore, the scope of the claims must be interpreted in the broadest manner to comprise all obvious modifications and equivalent arrangements.

What is claimed is:

1. A control method of a document processing system with one-key printing, the document processing system having a processing device, and the control method comprising the following steps executed by the processing device:
   receiving a scanning image;
   performing a printing process based on the scanning image and generating a prompt information when the scanning image having been stored;
   determining whether a one-key execution command is received after generating the prompt information; and
   performing the printing process again based on a stored scanning image when it is determined that the one-key execution command is received;
   being in a waiting state when the one-key execution command is not received;
   continuing to determine whether the one-key execution command is received if the processing device does not receive a new scanning image.

2. The control method according to claim 1, wherein the printing process comprises an automatic printout process.

3. The control method according to claim 1, wherein the step of generating the prompt information comprises generating a single tone or rhythmic syllables.

4. The control method according to claim 1, wherein the step of generating the prompt information comprises generating lighting or flashing lights.

5. A document processing system with one-key printing, comprising:
- a printing device;
- a scanning device disposed on one side of the printing device and provided for inputting a scanning image;
- an interface module provided for inputting commands or outputting information; and
- a processing device electrically connected to the printing device, the scanning device and the interface module respectively;
- wherein the processing device receives the scanning image, and performs a printing process based on the scanning image, so that the printing device performs printing, and generates a prompt information when the scanning image having been stored through the interface module; the processing device determines whether a one-key execution command input by the interface module is received after generating the prompt information; when the processing device determines that it receives the one-key execution command, the processing device performs the printing process again based on a stored scanning image, so that the printing device performs printing again, when the processing device determines that the one-key execution command is not received, the processing device is in a waiting state, and if the scanning device does not input a new scanning image, the processing device continues to determine whether the one-key execution command is received.

6. The document processing system according to claim 5, wherein the scanning device comprises a sheet feeding mechanism and a scanner.

7. The document processing system according to claim 5, wherein the interface module comprises a button unit and a prompt unit.

8. The document processing system according to claim 7, wherein the button unit comprises a physical button or a non-physical button.

9. The document processing system according to claim 7, wherein the prompt unit is a light-emitting unit, and the light-emitting unit generates lighting or flashing lights to generate the prompt information.

10. The document processing system according to claim 7, wherein the prompt unit is a sound unit, and the sound unit generates a single tone or rhythm syllables to generate the prompt information.

11. The document processing system according to claim 5, wherein the printing process means that the processing device sends the stored scanning image to the printing device, and drives the printing device to perform printing to print out a document.

* * * * *